United States Patent
Shi et al.

(10) Patent No.: US 12,295,009 B2
(45) Date of Patent: May 6, 2025

(54) METHODS AND DEVICES FOR SCHEDULING MULTIPLE CELLS WITH SINGLE DOWNLINK CONTROL INFORMATION

(71) Applicant: ZTE Corporation, Shenzhen (CN)

(72) Inventors: Jing Shi, Shenzhen (CN); Peng Hao, Shenzhen (CN); Xingguang Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 365 days.

(21) Appl. No.: 17/860,276

(22) Filed: Jul. 8, 2022

(65) Prior Publication Data

US 2022/0346131 A1 Oct. 27, 2022

Related U.S. Application Data

(63) Continuation of application No. PCT/CN2020/107731, filed on Aug. 7, 2020.

(51) Int. Cl.
*H04W 72/23* (2023.01)
(52) U.S. Cl.
CPC .................. *H04W 72/23* (2023.01)
(58) Field of Classification Search
CPC .................................. H04W 72/23
See application file for complete search history.

(56) References Cited

U.S. PATENT DOCUMENTS

| | | | |
|---|---|---|---|
| 11,582,776 B2 * | 2/2023 | Khoshnevisan | H04W 72/1263 |
| 2012/0039180 A1 | 2/2012 | Kim et al. | |
| 2016/0043843 A1 * | 2/2016 | Liu | H04L 5/0048 370/329 |
| 2016/0254948 A1 | 9/2016 | Chen et al. | |
| 2020/0022175 A1 | 1/2020 | Xiong et al. | |
| 2021/0037551 A1 * | 2/2021 | Khoshnevisan | H04W 72/53 |
| 2022/0201716 A1 * | 6/2022 | Yi | H04W 72/0453 |
| 2023/0156700 A1 * | 5/2023 | Liu | H04W 24/08 370/329 |

FOREIGN PATENT DOCUMENTS

| | | | | |
|---|---|---|---|---|
| CA | 2881659 A1 * | 3/2011 | ......... | H04J 11/0069 |
| CN | 103812625 A * | 5/2014 | | |

(Continued)

OTHER PUBLICATIONS

Extended European Search Report regarding EP 20 94 8749 dated Dec. 20, 2023, 18 pages.

(Continued)

*Primary Examiner* — Saad A. Waqas

(74) *Attorney, Agent, or Firm* — Crowell & Moring LLP

(57) ABSTRACT

The present disclosure describes methods, systems and devices for scheduling at least one cell with downlink control information (DCI) for a user equipment (UE). One method includes receiving, by the UE, the DCI via a physical downlink control channel (PDCCH) from a network base station, the DCI used to schedule at least one physical downlink shared channel (PDSCH) on the at least one cell. Another method includes sending, by a network base station to the UE, the DCI via a PDCCH, the DCI used to schedule at least one PDSCH on the at least one cell.

15 Claims, 8 Drawing Sheets

| CIF | Cell(s) |
|---|---|
| 0 | Cell A |
| 1 | Cell B |
| 2 | Cell C |
| 3 | Cell D |
| 4 | Cell A and Cell B |
| 5 | Cell C and Cell D |
| 6 | - |
| 7 | - |

(56) References Cited

FOREIGN PATENT DOCUMENTS

| CN | 104769990 A | | 7/2015 | |
| CN | 103548409 B | * | 7/2017 | ............. H04L 5/001 |
| CN | 111316741 A | * | 6/2020 | ............. H04L 5/001 |
| KR | 20190072380 A | * | 6/2019 | |
| WO | WO-2021134412 A1 | * | 7/2021 | ............. H04L 5/0001 |

OTHER PUBLICATIONS

Partial Supplementary European Search Report regarding EP 20 94 8749 dated Sep. 19, 2023, 21 pages.

Huawei et al, "NR CA enhancements and D88," 3GPP DRAFT; RP-192797, 3rd Generation Partnership Project (3GPP), Mobile Competence Centre, 650, Route Des Lucioles; F-06921 Sophia-Antipolis Cedex, France, vol. TSG RAN, No. Sitges, Spain, Dec. 2, 2019, XP051834390, Retrieved from the Internet: https://ftp.3gpp.org/tsg_ran/TSG_RAN/TSGR_86/Docs/RP-192797.zip RP192797_NR CAenhancements-final.docx Ericsson, "New WID on NR Dynamic spectrum sharing (DSS)," 3GPP Draft, RP-193260, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 12, 2019, XP051840390 Retrieved from the Internet: https://ftp.3gpp.org/tsg_ran/TSG_RAN/TSGR_86/Docs/RP-193260.zip RP193260 NewWID on NR Dynamic spectrum sharing(DSS).docx International Search Report and Written Opinion regarding PCT/CN2020/107731 dated May 8, 2021.

ZTE. "3GPP TSG-RANWGI #60 RI-100959" 1-22 Further discussion on carrier indicator field, Feb. 26, 2010.

Chinese Office Action and English translation of Office Action regarding 202080094601.7 dated Sep. 9, 2024, 23 pages.

Nokia, Nokia Shanghai Bell, R-1-2000432, "Maintenance of Rel-16 URLLC PDCCH enhancements," SGPP TSG RAN/wg1_r11, tsgr1_100_e, dated Feb. 15, 2020, 28 pages.

Chinese language Office Action with English translation regarding Application No. 202080094601.7 dated Feb. 17, 2025 (16 pages).

* cited by examiner

400

> receiving, by the UE, the DCI via a physical downlink control channel (PDCCH) from a network base station, the DCI used to schedule at least one physical downlink shared channel (PDSCH) on the at least one cell    410

> sending, by a network base station to the UE, the DCI via a physical downlink control channel (PDCCH), the DCI used to schedule at least one physical downlink shared channel (PDSCH) on the at least one cell    510

| CIF=0 | Cell A |
|---|---|
| CIF=1 | Cell B |
| CIF=2 | Cell C |
| CIF=3 | Cell D |

| CIF | Single cell scheduling | Two cells scheduling |
|---|---|---|
| 0 | Cell A | Cell A and Cell B |
| 1 | Cell B | Cell B and Cell C |
| 2 | Cell C | Cell C and Cell D |
| 3 | Cell D | Cell D and Cell E |
| 4 | Cell E | Cell E and Cell F |
| 5 | Cell F | Cell F and Cell G |
| 6 | Cell G | Cell G and Cell H |
| 7 | Cell H | Cell H and Cell A |

| CIF | Single cell scheduling | Two cells scheduling |
|---|---|---|
| 0 | Cell A | - |
| 1 | Cell B | Cell B and Cell A |
| 2 | Cell C | Cell C and Cell A |
| 3 | Cell D | Cell D and Cell A |
| 4 | Cell E | Cell E and Cell A |
| 5 | Cell F | Cell F and Cell A |
| 6 | Cell G | Cell G and Cell A |
| 7 | Cell H | Cell H and Cell A |

FIG. 7B

| CIF | Single cell scheduling | Two cells scheduling |
|---|---|---|
| 0 | Cell A | Cell A and Cell F |
| 1 | Cell B | Cell B and Cell A |
| 2 | Cell C | Cell C and Cell A |
| 3 | Cell D | Cell D and Cell A |
| 4 | Cell E | Cell E and Cell A |
| 5 | Cell F | Cell F and Cell A |
| 6 | Cell G | Cell G and Cell A |
| 7 | Cell H | Cell H and Cell A |

FIG. 7C

| CIF | Single cell scheduling | Two cells scheduling |
|---|---|---|
| 0 | Cell A | Cell A and Cell D |
| 1 | Cell B | Cell B and Cell A |
| 2 | Cell C | Cell C and Cell G |
| 3 | Cell D | Cell D and Cell F |
| 4 | Cell E | Cell E and Cell B |
| 5 | Cell F | Cell F and Cell H |
| 6 | Cell G | Cell G and Cell C |
| 7 | Cell H | Cell H and Cell E |

FIG. 7D

| CIF | Cell(s) |
|---|---|
| 0 | Cell A |
| 1 | Cell B |
| 2 | Cell C and Cell D |
| 3 | - |
| 4 | - |
| 5 | - |
| 6 | - |
| 7 | - |

FIG. 8

| CIF | Cell(s) |
|---|---|
| 0 | Cell A |
| 1 | Cell B |
| 2 | Cell C |
| 3 | Cell D |
| 4 | Cell A and Cell B |
| 5 | Cell C and Cell D |
| 6 | - |
| 7 | - |

FIG. 9A

| CIF | Cell(s) |
|---|---|
| 0 | Cell A |
| 1 | Cell B |
| 2 | Cell C |
| 3 | Cell D |
| 4 | Cell A and Cell B |
| 5 | Cell C and Cell D |
| 6 | Cell A and Cell C |
| 7 | Cell B and Cell D |

FIG. 9B

METHODS AND DEVICES FOR SCHEDULING MULTIPLE CELLS WITH SINGLE DOWNLINK CONTROL INFORMATION

CROSS-REFERENCE TO RELATED APPLICATION

This application is a continuation application of PCT International Patent Application No. PCT/CN2020/107731, filed with the China National Intellectual Property Administration, PRC on Aug. 7, 2020, which is herein incorporated by reference in its entirety.

TECHNICAL FIELD

The present disclosure is directed generally to wireless communications. Particularly, the present disclosure relates to methods and devices for scheduling multiple cells with single downlink control information (DCI).

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. There are some issues and/or problems associated with scheduling one or more cells with single downlink control information (DCI). The present disclosure may address at least some of issues associated with the existing system to improve the performance of the wireless communication.

SUMMARY

This document relates to methods, systems, and devices for wireless communication, and more specifically, for scheduling multiple cells with single downlink control information (DCI).

In one embodiment, the present disclosure describes a method for wireless communication. The method includes scheduling at least one cell with downlink control information (DCI) for a user equipment (UE) by receiving, by the UE, the DCI via a physical downlink control channel (PDCCH) from a network base station, the DCI used to schedule at least one physical downlink shared channel (PDSCH) on the at least one cell.

In another embodiment, the present disclosure describes a method for wireless communication. The method includes scheduling at least one cell with downlink control information (DCI) for a user equipment (UE) by sending, by a network base station to the UE, the DCI via a physical downlink control channel (PDCCH), the DCI used to schedule at least one physical downlink shared channel (PDSCH) on the at least one cell.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 5 shows a flow diagram of another method for wireless communication.

FIG. 6 shows an exemplary embodiment of a table including a list of carrier indicator fields (CIFs) and corresponding cells.

FIG. 7A shows another exemplary embodiment of a table including a list of CIFs and corresponding cells.

FIG. 7B shows another exemplary embodiment of a table including a list of CIFs and corresponding cells.

FIG. 7C shows another exemplary embodiment of a table including a list of CIFs and corresponding cells.

FIG. 7D shows another exemplary embodiment of a table including a list of CIFs and corresponding cells.

FIG. 8 shows another exemplary embodiment of a table including a list of CIFs and corresponding cells.

FIG. 9A shows another exemplary embodiment of a table including a list of CIFs and corresponding cells.

FIG. 9B shows another exemplary embodiment of a table including a list of CIFs and corresponding cells.

DETAILED DESCRIPTION

Figure 1:
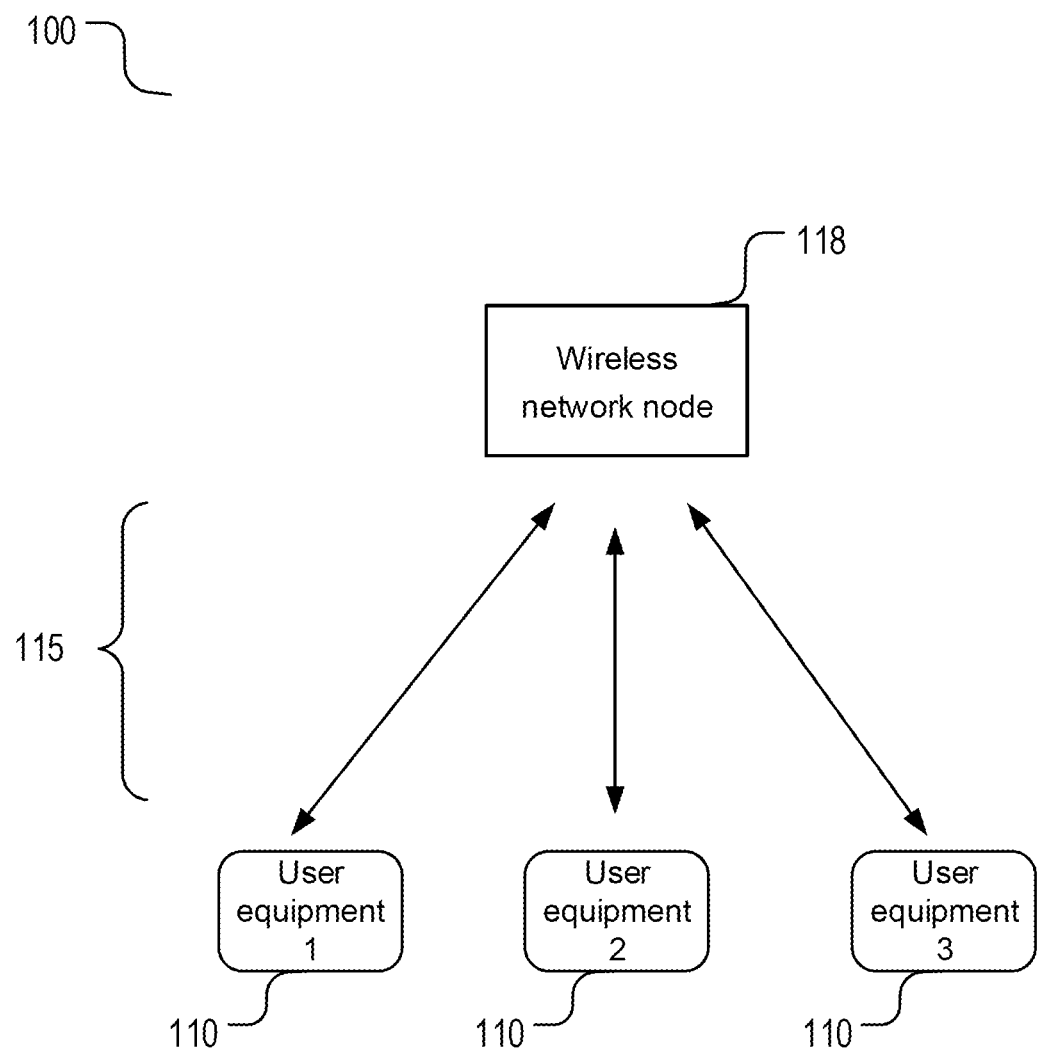
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for scheduling one or more cells with single downlink control information (DCI).

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

The 4th Generation mobile communication technology (4G) Long-Term Evolution (LTE) or LTE-Advance (LTE-A) and the 5th generation mobile communication technology (5G) face more and more demands. Based on the developing trend, 4G and 5G systems may develop supports on features of enhanced mobile broadband (eMBB), ultra-reliable low-latency communication (URLLC), and massive machine-type communication (mMTC). Some spectrum used for 4G may be reused for 5G according to dynamic spectrum sharing (DSS).

In the 5G communication system, a secondary serving cell (SCell) may be only scheduling cell or scheduled cell, while primary cell (PCell) or primary secondary cell (PS-Cell) may be a scheduling cell and may not be a scheduled cell. Some issues and/or problems associated with the current system. One issue/problem may include that physical downlink control channel (PDCCH) of PCell/PSCell may schedule physical downlink shared channel (PDSCH) or physical uplink shared channel (PUSCH) on SCell, but PDSCH or PUSCH on PCell/PSCell may not be scheduled by PDCCH of SCell. Considering DSS in NR communication system, a resource of PDCCH of PCell/PSCell may be restricted. In case PDCCH of PCell/PSCell/SCell scheduling PDSCH on one or two cells using a single DCI, problems and/or issues may include how to schedule two cells, how to fallback to schedule one cell of the two cells, how to achieve that the total PDCCH blind decoding budget may not be changed.

The present disclosure describes various embodiments for scheduling multiple cells with single downlink control information (DCI), addressing at least some of the issues/problems discussed above. Some embodiments include, for off-load the PCell/PSCell PDCCH, how NR PDCCH enhancements for cross-carrier scheduling include PDCCH of PCell/PSCell/SCell scheduling PDSCH on one or more cells using a single DCI.

FIG. 1 shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time. The network base station 118 may send high layer signalling to the UE 110. The high layer signalling may include configuration information for communication between the UE and the base station. In one implementation, the high layer signalling may include a radio resource control (RRC) message.

Figure 2:
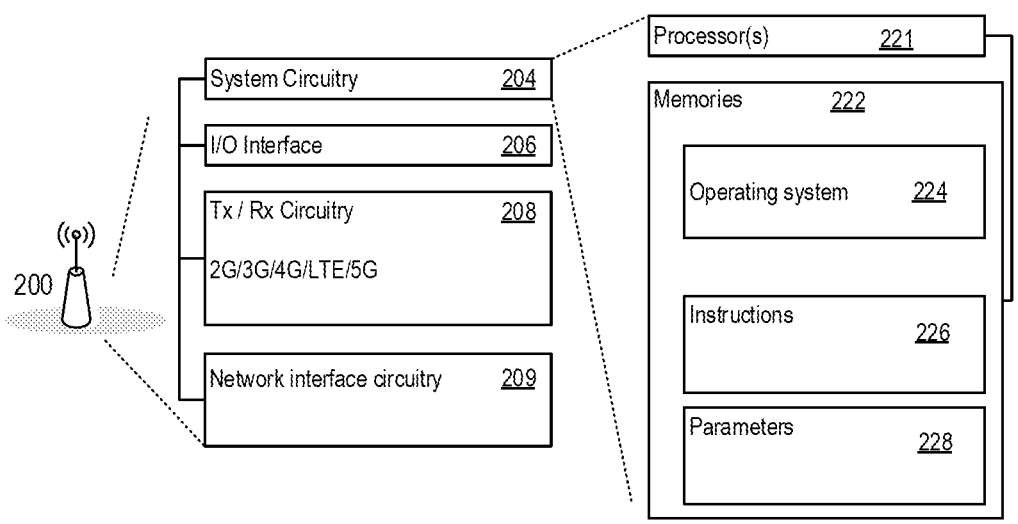
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
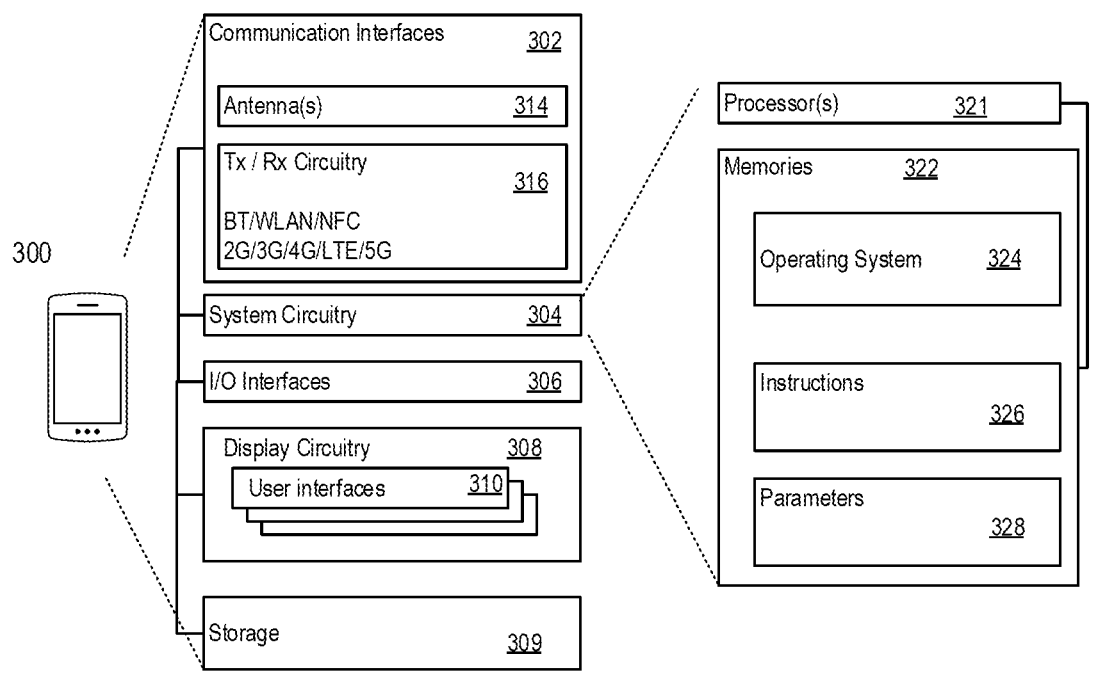
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above in FIGS. 2-3.

Referring to FIG. 4, the present disclosure describes embodiments of a method 400 for scheduling at least one cell with downlink control information (DCI) for a user equipment (UE). The method 400 may include step 410: receiving, by the UE, the DCI via a physical downlink control channel (PDCCH) from a network base station, the DCI used to schedule at least one physical downlink shared channel (PDSCH) on the at least one cell.

Referring to FIG. 5, the present disclosure describes embodiments of a method 500 for scheduling at least one cell with downlink control information (DCI) for a user equipment (UE). The method 500 may include step 510: sending, by a network base station to the UE, the DCI via a physical downlink control channel (PDCCH), the DCI used to schedule at least one physical downlink shared channel (PDSCH) on the at least one cell. The at least one cell may include one cell, two cells, three cells, or more than three cells. In the present disclosure, various embodiments and implementations are described with one or two cells as examples, which do not impose a limitation on the scope of the present disclosure. The methods, devices, and systems in the described embodiments/implementations may be applicable when the at least one cell includes more than two cells.

In one implementation of various embodiments, the at least one cell includes a first cell and a second cell. The DCI is used to schedule the first cell and the second cell according to one of the following methods. Method 1 includes scheduling the first cell and the second cell in a semi-static mode, wherein a combination of the first cell and the second cell is semi-statically configured by high layer signalling. Method 2 includes scheduling the first cell and the second cell in a dynamic mode, wherein the combination of the first cell and the second cell is dynamically indicated by the DCI. Method 3 includes scheduling the first cell and the second cell in a semi-dynamic mode, wherein the DCI schedules the first cell and the second cell to be one of combinations semi-statically configured by the high layer signalling. Method 4 includes scheduling the first cell and the second cell in a predefined mode, wherein the first cell is indicated by the DCI and the second cell is predefined according to the first cell.

Optionally in another implementation of various embodiments, the DCI comprises a carrier indicator field (CIF). The first cell is indicated by the DCI and the second cell is predefined according to the first cell comprising one of the following methods. Method 1 includes scheduling the first cell according to the CIF and scheduling the second cell according to another CIF being CIF+1. Method 2 includes scheduling the first cell according to the CIF and scheduling the second cell according to another CIF being zero. Method 3 includes scheduling the first cell according to the CIF and scheduling the second cell according to another CIF that is configured by the high layer signalling.

Optionally in another implementation of various embodiments, each of the first cell and the second cell is configured to correspond to at least one CIF according to a CIF configuration. The CIF configuration comprises one of the following methods. Method 1 includes configuring each of the first cell and the second cell with a CIF and configuring different cells with different CIFs. Method 2 includes configuring each of the first cell and the second cell with a CIF and allowing different cells with a same CIF. Method 3 includes configuring each of the first cell and the second cell with a first CIF and a second CIF, wherein the first CIF is used as single cell scheduling and the second CIF is used as two-cell scheduling.

Optionally in another implementation, in response to the first cell and the second cell with the same CIF, one physical uplink shared channel (PUSCH) on one cell is scheduled according to one of the following methods. Method 1 includes, according to a configuration by high layer signaling, one of the first cell and the second cell used for the PUSCH. Method 2 excluding, according to a configuration by high layer signaling, one of the first cell and the second cell for concluding uplink cell. Method 3 excluding, according to a configuration by high layer signaling, both of the first cell and the second cell for concluding uplink cell.

Optionally in another implementation, the DCI is used to schedule a single cell in a fallback scheduling mode by one of the following methods. Method 1 includes the DCI comprising a first CIF and a second CIF wherein a value of the first CIF is same as a value of the second CIF. Method 2 includes the DCI comprising the first CIF and the second CIF wherein one of the first CIF and the second CIF comprises a special value. Method 3 includes the DCI comprising at least one independent indication field wherein all of the independent indication fields have the special value. For example but not limited to, the special value may include at least one of a non-numerical value, all '0', all '1', or a value configured by the high layer signalling.

Optionally in another implementation, a size of the DCI is determined by the following: for one or more shared indicator field in the DCI for the first cell and the second cell, determining a size of the one or more shared indicator filed based on a largest size among the at least one cell; and for one or more independent indicator field in the DCI for the first cell and the second cell, determining a size of the one or more separate indicator field based on at least one of the following methods. Method 1 includes a size of the first cell and a largest size among the at least one cell except the first cell. Method 2 includes a size of the first cell and a largest size for each of the one or more independent indicator field among the at least one cell except the first cell.

Optionally in another implementation, a DCI size alignment is determined by at least one of the following methods. Method 1 includes that, in response to the DCI scheduling two cells and a DCI size budget is not maintained, DCI format 0_1 and format 1_1 are aligned. Method 2 includes that, in response to DCI format 1_2 and format 0_2 are configured, aligning at least one of the following: a DCI format 0_1, format 1_1, format 1_2 and format 0_2; or a DCI format 0_1, format 1_1 and the DCI scheduling two cells.

Optionally in another implementation, a UE-specific search space (USS) for detecting the DCI carried by PDCCH is determined by at least one of the following methods. Method 1 includes determining the USS for blind decoding the PDCCH based on one of the first cell and the second cell. Method 2 includes determining the USS for blind decoding the PDCCH based on both of the first cell and the second cell. Method 3 includes, in response to the first cell and the second cell having a same CIF, determining the USS for blind decoding the PDCCH based on a union set of an aggregation level (AL) and candidates corresponding to the first cell and the second cell. Method 4 includes, in response to one of the first cell and the second cell having more than one CIFs, determining the USS based on ($n_{CI}$ mod $N_{CI}$) wherein the $N_{CI}$ is a predefined or configured value. Method 5 includes, in response to one of the first cell and the second cell having more than one CIFs, determining the USS based on a CIF corresponding to a single cell scheduling for at least one of the first cell and the second cell.

The present disclosure describes various exemplary embodiments below, which merely serve as examples and do not put limitations on the scope of the present disclosure.

In one embodiment, the present disclosure describes a method for using a single DCI including two CIFs as independent indication for two cells. This embodiment may address at least some of the issues/problems discussed above with the existing systems, and come with certain technical benefits. For example, the downlink shared channel of two cells is scheduled by dynamic indication, so as to realize flexible combination of two cells. When the DCI size is determined, the type of DCI size and the blind detection complexity may be guaranteed not to exceed the existing budget, and no additional complexity is introduced. With the maximum flexibility, the method may support the downlink service channel function of one DCI scheduling two cells to improve the system efficiency.

In carrier aggregation (CA) scenario, a single DCI of two scheduled cells may be transmitted on scheduling cell, which may be any one of PCell, PSCell, or SCell, and the DCI may be carried by a PDCCH. The DCI may include two independent CIF indications, which respectively indicate the two scheduled cells.

In one implementation, the combination of two cells may be arbitrary, that is, the DCI may schedule PDSCH on any two CIF corresponding carriers. For example, referring to FIG. 6, there are four cells 614 and four CIF values 612. Each of four cells 614 corresponds to a unique configured CIF index 612, for example, a CIF with value "0" may indicate Cell A, a CIF with value "1" may indicate Cell B, a CIF with value "2" may indicate Cell C, a CIF with value "3" may indicate Cell D. The DCI may include any possible combination of valid CIF values indicating any possible combination of two cells from the four cells, for example but not limited to, {CIF=0, CIF=1}, {CIF=1, CIF=2}, etc.

Optionally in another implementation, the combination of two cells may be a limited combination of semi-static configurations. For example, there are four carriers, and the configured CIF index is shown in FIG. 6. In one implementation, the candidate combination of two cells in semi-static configuration may include {cell A, cell B}, {cell A, cell C}, {cell A, cell D}, {cell B, cell C}, and {cell C, cell D}, and the combination of two cells may be dynamically indicated in the candidate combination of semi-static configuration, such as {CIF=0, CIF=1}, {CIF=2, CIF=3}. In this particular example, {CIF=1, CIF=3} may not be indicated because {cell B, cell D} is not one of the candidate combinations in semi-static configuration.

Optionally in another implementation, the method may include using the DCI to schedule one cell of the two cells. This implementation may include several methods, which may be used to realize that the DCI may be used to schedule one cell. One method may include that two CIFs indicate the same value, which indicating the same cell. Another method may include that one of the two CIFs is valid and another CIF has a special value, for example but not limited to, the special value includes a non-numerical value, all "1", or all "0". Another method may include that all the independent indication fields for the second cell in DCI may be set to special values, for example but not limited to, the special value may be the same value for different independent indication fields, such as non-numerical value, all 0, all 1, or a value configured by high layer signalling. Optionally, the special value of different independent indication fields may be set independently.

Optionally in another implementation, the method may include determining the DCI size. For one or more shared indicator fields, the cell with the largest size may be used for determining the DCI size. For example, the cell with the largest size in the valid cell in the dynamic combination may be used to determine the size of a field. One or more least significant bit (LSB) of the field for other cells may be valid, and the indication of the one or more most significant bit (MSB) may be ignored. For one or more independent indicator fields, one implementation may include several methods. One method includes that the combination of one cell and other cells with the largest size is the size for determining the DCI size with the 1 DCI scheduling 2 cells. Under some circumstances when the carrier combination of 2 cells is dynamic, the DCI size with 1 DCI scheduling 2 cells may be determined by adding the maximum size of other cells and the size of this cell. Another method includes that the combination of the maximum size of each bit field in other cells and this cell may be used to determine the DCI size with 1 DCI scheduling 2 cells. The latter method may result in a larger DCI size, considering that each bit field is determined by the maximum size of other cells.

Optionally in another implementation, the method may include, after determining the DCI size, determining a DCI size alignment. In response to no new DCI format being introduced to schedule two cells, there is no need to modify the existing method. In response to a new DCI format being introduced, a new DCI size alignment method may be introduced as discussed in below embodiments corresponding to the introduced new DCI format.

Optionally in another implementation, the method may include determining a UE-specific search space (USS) for detecting the DCI carried by PDCCH in the scheduling cell. This implementation may include several methods for determining the USS. One method includes determining the USS for performing blind decode the PDCCH based on one of the first CIF or the second CIF in the DCI. For example, the USS may be determined based on the first CIF. For another example, the USS may be determined based on a CIF configured by high layer signalling. Another method includes determining the USS for performing blind decode the PDCCH based on both of the first CIF and the second CIF in the DCI. The complexity of blind detection in the former method 1 is relatively low, and the scheduling flexibility of the latter method is relatively high. The DCI size in each USS may be determined by the CIF corresponding to the cell.

Optionally in another implementation, the method may include determining a number of carriers of a certain subcarrier spacing (SCS) for determining $M_{PDCCH}^{total,slot,\mu}$ or $C_{PDCCH}^{total,slot,\mu}$, in carrier aggregation (CA) scenario and a number of configured carriers is greater than a number of supported carriers reported by UE. This implementation may include several methods for determining the number of SCS. One method includes that, for the DCI scheduling two cells and performing the blind decode PDCCH in the USS determined by the first CIF and the second CIF, the two cells may count the number of SCS corresponding to the scheduling cell as two. Another method includes that, for the DCI scheduling two cells and perform the blind decode PDCCH in the USS determined by one of the first CIF or the second CIF, the two cells count the number of SCS corresponding to the scheduling cell as one or two. For example, when the count is 1, no blind decode PDCCH is performed in the USS determined by another CIF; and when the count is 2, the DCI size determined by the corresponding cell of another CIF is performed for blind decode PDCCH in the USS determined by the CIF. When the count is 2 cells, a blind decoding (BD) complexity is constant, which may be equivalent to that the USS of two cells are both blind decoded, and it may be equivalent to counting all the number of scheduled cells for the SCS corresponding to the scheduling cell when performing CA scaling.

In another embodiment, the present disclosure describes another method for using a single DCI including a single CIF as indication for two cells based on a predefined configuration. This embodiment may address at least some of the issues/problems discussed above with the existing systems, and come with certain technical benefits. For example, the downlink shared channel of two cells is scheduled by one single CIF in the DCI according to predefined configuration, so as to realize flexible combination of two cells. When the DCI size is determined, the type of DCI size and the blind detection complexity may be guaranteed not to exceed the existing budget, and no additional complexity is introduced. With the maximum flexibility, the method may support the downlink service channel function of one DCI scheduling two cells to improve the system efficiency.

In carrier aggregation (CA) scenario, a single DCI of two scheduled cells may be transmitted on scheduling cell, which may be any one of PCell, PSCell, or SCell, and the DCI may be carried by a PDCCH. The DCI may include one CIF indication, which indicates one of the two scheduled cells. The other cell of the two scheduled cells may be indicated based on the CIF indication in the DCI by the predefined rule.

In one implementation, the first cell is indicated by the DCI and the second cell is determined by the predefined rule according to the first cell comprising at least one of the following methods.

Referring to FIG. 7A, method 1 may include scheduling the first cell according to the CIF and scheduling the second cell according to another CIF being CIF+1. FIG. 7A shows one or more CIF values 714, each of which corresponds to a cell for a single cell scheduling 714 and two cells for two cells scheduling 716. For example, CIF=2 (717) corresponds to Cell C for single cell scheduling. In response to two cells scheduling, CIF=2 corresponds to Cell C, which is indicated by CIF=2 itself, and Cell D, which indicated by (CIF+1)=3. In one implementation, when CIF+1 is larger than the largest allowable CIF value, modular calculation may be applied. For example, referring to 718 in FIG. 7A, when CIF=7 and the largest allowable CIF value is 7, (CIF+1) mod 8 yields 0, which corresponds to Cell A.

Referring to FIG. 7B, method 2 may include scheduling the first cell according to the CIF and scheduling the second cell according to another CIF being zero. FIG. 7B shows one or more CIF values 724, each of which corresponds to a cell for a single cell scheduling 724 and two cells for two cells scheduling 726. For example, CIF=4 (728) corresponds to Cell E for single cell scheduling. In response to two cells scheduling, CIF=4 corresponds to Cell E, which is indicated by CIF=4 itself, and Cell A, which indicated by CIF being 0. In one implementation, referring to 727 in FIG. 7B, when CIF=0, only a single cell scheduling is allowed. In another implementation, referring to 737 in FIG. 7C, when CIF=0, the two cells scheduling may include Cell A and another Cell (e.g., Cell F) configured by high layer signalling.

Referring to FIG. 7D, method 3 may include scheduling the first cell according to the CIF and scheduling the second cell according to another CIF that is configured by the high layer signalling. FIG. 7D shows one or more CIF values 744, each of which corresponds to a cell for a single cell scheduling 744 and two cells for two cells scheduling 746. For example, CIF=4 (748) corresponds to Cell E for single cell scheduling. In response to two cells scheduling, CIF=4 corresponds to Cell E, which is indicated by CIF=4 itself, and Cell B, which is configured by high layer signalling according to CIF=4.

Optionally in anther implementation, high layer signalling may configure whether a single cell or two cells should be scheduled for a given DCI.

Optionally in another implementation, the method may include using the DCI to schedule one cell of the two cells. This implementation may include several methods, which may be used to realize that the DCI may be used to schedule one cell. One method may include that the CIF has a special value, for example but not limited to, the special value includes a non-numerical value, all "1", or all "0". Another method may include that all the independent indication fields for the second cell in DCI may be set to special values, for example but not limited to, the special value may be the same value for different independent indication fields, such as non-numerical value, all 0, all 1, or a value configured by high layer signalling. Optionally, the special value of different independent indication fields may be set independently.

Optionally in another implementation, the method may include determining the DCI size. For one or more shared indicator fields, the cell with the largest size may be used for determining the DCI size. For example, the cell with the largest size in the valid cell in the dynamic combination may be used to determine the size of a field. One or more least significant bit (LSB) of the field for other cells may be valid, and the indication of the one or more most significant bit (MSB) may be ignored. For one or more independent indicator fields, the method includes that the combination of one cell and the other cells is the size for determining the DCI size with the 1 DCI scheduling 2 cells.

Optionally in another implementation, the method may include, after determining the DCI size, determining a DCI size alignment. In response to no new DCI format being introduced to schedule two cells, there is no need to modify the existing method. In response to a new DCI format being introduced, a new DCI size alignment method may be introduced as discussed in below embodiments corresponding to the introduced new DCI format.

Optionally in another implementation, the method may include determining a UE-specific search space (USS) for detecting the DCI carried by PDCCH in the scheduling cell. This implementation may include several methods for determining the USS. One method includes determining the USS for performing blind decode the PDCCH based on the CIF in the DCI. Another method includes determining the USS for performing blind decode the PDCCH based on both of the first cell indicated by the CIF in the DCI and the second cell predefined according to the first cell. The complexity of blind detection in the former method 1 is relatively low, and the scheduling flexibility of the latter method is relatively high. The latter method has a higher flexibility compared with the former method. The DCI size in each USS may be determined by the CIF corresponding to the cell.

Optionally in another implementation, the method may include determining a number of carriers of a certain subcarrier spacing (SCS) for determining $M_{PDCCH}^{total,slot,\mu}$ or $C_{PDCCH}^{total,slot,\mu}$, in carrier aggregation (CA) scenario and a number of configured carriers is greater than a number of supported carriers reported by UE. This implementation may include several methods for determining the number of SCS.

One method includes that, for the DCI scheduling two cells and performing the blind decode PDCCH in the USS determined by both of the two cells, the two cells may count the number of SCS corresponding to the scheduling cell as two or four. In one implementation, when the two cells counts the number of SCS as two, the blind decode PDCCH with the DCI size determined based on the second cell may be performed in the USS determined by the second cell. In another implementation, when the two cells counts the number of SCS as four, the blind decode PDCCH with the DCI size determined based on both cells may be performed in the USS determined by the second cell.

Another method includes that, for the DCI scheduling two cells and perform the blind decode PDCCH in the USS determined by the CIF in the DCI, the two cells count the number of SCS corresponding to the scheduling cell as one or two. For example, when the count is 1, no blind decode PDCCH is performed in the USS determined by the second cell; and when the count is 2, the DCI size determined by the corresponding cell of the second cell is performed for blind decode PDCCH in the USS determined by the second cell. When the count is 2 cells, a blind decoding (BD) complexity is constant, which may be equivalent to that the USS of two cells are both blind decoded, and it may be equivalent to counting all the number of scheduled cells for the SCS corresponding to the scheduling cell when performing CA scaling.

In another embodiment, the present disclosure describes another method for using a single DCI including a single CIF as indication for two cells based on configuring two cells with a same CIF value. This embodiment may address at least some of the issues/problems discussed above with the existing systems, and come with certain technical benefits. For example, the downlink shared channel of two cells is scheduled by one single CIF in the DCI according to configured combination of two cells by high layer signalling, so as to realize scheduling two cells according to fixed combination of two cells. When the DCI size is determined, the type of DCI size and the blind detection complexity may be guaranteed not to exceed the existing budget, and no additional complexity is introduced. With the maximum flexibility, the method may support the downlink service channel function of one DCI scheduling two cells to improve the system efficiency.

In carrier aggregation (CA) scenario, a single DCI of two scheduled cells may be transmitted on scheduling cell, which may be any one of PCell, PSCell, or SCell, and the DCI may be carried by a PDCCH. The DCI may include one CIF indication, which indicates the two cells configured to have the same CIF value by the high layer signalling.

Referring to FIG. 8, the method may include scheduling two cells with a single CIF in the DCI based on the two cells being configured with the same CIF by the high layer signalling. FIG. 8 shows one or more CIF values 812, each of which corresponds to one or more cell for scheduling 814. Some of the CIF values may indicate a single cell, for example, when the DCI includes a CIF=1 (817), single cell scheduling (i.e., Cell B) is indicated. Some of the CIF values may indicate two cells, for example, when the DCI includes a CIF=2 (818), two cells scheduling (i.e., Cell C and Cell D) is indicated.

In the embodiment, for example referring to FIG. 8, Cell A is configured for CIF=0; Cell B is configured for CIF=1; and Cell C and Cell D are configured for a same CIF=2, which may be configured by high layer signalling, for example but not limited to, a RRC message.

Optionally in one implementation, the method may include scheduling physical uplink shared channel (PUSCH) on one of the two cells when the two cells are configured for the same CIF, which may be performed by one of the following methods. Method 1 includes only one of the two cells used for the PUSCH according to a configuration by high layer signaling. Method 2 includes one of the two cells not concluding uplink cell according to a configuration by high layer signaling. Method 3 includes both of the two cells not concluding uplink cell according to a configuration by high layer signaling.

Optionally in anther implementation, high layer signalling may configure whether a single cell or two cells should be scheduled for a given DCI.

Optionally in another implementation, the method may include determining and configuring a first cell and a second cell for the two cells configured for the same CIF and determining a specific position of independent indication fields in the DCI and corresponding relationship between the two cells.

Optionally in another implementation, the method may include using the DCI to schedule one cell of the two cells. This implementation may include several methods, which may be used to realize that the DCI may be used to schedule one cell. One method may include that all the independent indication fields for the second cell in DCI may be set to special values, for example but not limited to, the special value may be the same value for different independent indication fields, such as non-numerical value, all 0, all 1, or a value configured by high layer signalling. Optionally, the special value of different independent indication fields may be set independently.

Optionally in another implementation, the method may include determining the DCI size. For one or more shared indicator fields, the cell with the largest size may be used for determining the DCI size. For example, the cell with the largest size in the valid cell in the dynamic combination may be used to determine the size of a field. One or more least significant bit (LSB) of the field for other cells may be valid, and the indication of the one or more most significant bit (MSB) may be ignored. For one or more independent indicator fields, the method includes that the combination of one cell and the other cells is the size for determining the DCI size with the 1 DCI scheduling 2 cells.

Optionally in another implementation, the method may include, after determining the DCI size, determining a DCI size alignment. In response to no new DCI format being introduced to schedule two cells, there is no need to modify the existing method. In response to a new DCI format being introduced, a new DCI size alignment method may be introduced as discussed in below embodiments corresponding to the introduced new DCI format.

Optionally in another implementation, the method may include determining a UE-specific search space (USS) for detecting the DCI carried by PDCCH in the scheduling cell. This implementation may include several methods for determining the USS.

Method 1 includes determining the USS for performing blind decode the PDCCH based on one of the two cells indicated by the CIF in the DCI. In this method, the blind decode may be performed in the USS based on one cell and may be similar to existing method. The blind decode complexity may be decreased. In one implementation, the method includes determining an aggregation level (AL) and candidates corresponding to one of the two cells. In another implementation, the method include determining configuration with more candidates.

Method 2 includes determining the USS for performing blind decode the PDCCH based on both of the two cells indicated by the CIF in the DCI. The method may include, in response to the first cell and the second cell having a same CIF, determining the USS for blind decoding the PDCCH based on a union set of an aggregation level (AL) and candidates corresponding to both of the two cells. In this method, the total candidates corresponding to the 1 DCI scheduling 2 Cells may be equal to or smaller in number than the summation of candidates for each of the two cells; and the blind decode complexity may be the same (or similar) or decreased.

Method 3 includes determining the USS for performing blind decode the PDCCH based on both of the two cells indicated by the CIF in the DCI. The method may include, in response to the first cell and the second cell having a same CIF, determining the USS for blind decoding the PDCCH based on individual cell of the two cells and performing blind decode in individual determined USS based on AL and candidates corresponding to individual cell of the two cells.

Among the three methods discussed above, method 1 includes performing blind decode PDCCH in the USS based on the CIF in the DCI; method 2 includes performing blind decode PDCCH in the USS based on a union set of AL and candidates corresponding to the two cells; and method 3 includes performing blind decode PDCCH in individually determined USS based on individual cell of the two cells. In one implementation, the complexity of blind detection in the method 1 is relatively low, and the scheduling flexibility of the method 3 is relatively high. The DCI size in each USS may be determined by the CIF corresponding to the cell.

Optionally in another implementation, the method may include determining a number of carriers of a certain subcarrier spacing (SCS) for determining $M_{PDCCH}^{total,slot,\mu}$ or $C_{PDCCH}^{total,slot,\mu}$, in carrier aggregation (CA) scenario and a number of configured carriers is greater than a number of supported carriers reported by UE. This implementation may include several methods for determining the number of SCS.

Method 1 includes that, for the DCI scheduling two cells and performing the blind decode PDCCH in the USS determined by one of the two cells, the two cells may count the number of SCS corresponding to the scheduling cell as one. In one implementation, this method may perform the blind decode PDCCH in the USS according to one cell, decreasing blind decoding (BD).

Method 2 includes that, for the DCI scheduling two cells and perform the blind decode PDCCH in the USS based on a union set of AL and candidates according the two cells, the two cells count the number of SCS corresponding to the scheduling cell as two. Method 2 may also include that, for the DCI scheduling two cells and perform the blind decode PDCCH in the individual USS based on individual cells of the two cells, the two cells count the number of SCS corresponding to the scheduling cell as two. In one implementation, this method may count the number of SCS corresponding to the scheduling cell as two according to a larger BD. When the number of SCS corresponding to the scheduling cell is counted as two, the BD complexity does not change, which may be similar to the number of SCS corresponding to the scheduling cell for performing the carrier aggregation scaling for determining the scheduled cells.

In another embodiment, the present disclosure describes another method for using a single DCI including a single CIF as indication for two cells based on configuring one cell with more than one CIF values. This embodiment may address at least some of the issues/problems discussed above with the existing systems, and come with certain technical benefits. For example, the downlink shared channel of two cells is scheduled by one single CIF in the DCI according to configured combination of two cells by high layer signalling, so as to realize scheduling two cells according to fixed combination of two cells. When the DCI size is determined, the type of DCI size and the blind detection complexity may be guaranteed not to exceed the existing budget, and no additional complexity is introduced. With the maximum flexibility, the method may support the downlink service channel function of one DCI scheduling two cells to improve the system efficiency.

In carrier aggregation (CA) scenario, a single DCI of two scheduled cells may be transmitted on scheduling cell, which may be any one of PCell, PSCell, or SCell, and the DCI may be carried by a PDCCH. The DCI may include one CIF indication indicating two cells, which are configured to have more than one CIF values by the high layer signalling.

Optionally in one implementation, the method may include configuring one cell with N CIF values, and indicating whether a single cell scheduling or two cell scheduling based on CIF code point. In one implementation, the method may support dynamic scheduling for a particularly cell between single cell scheduling and two cells scheduling, which may increase the types of DCI size. In another implementation, for example and preferably, the first CIF value of the N CIF values for the cell may be used as the CIF value for single cell scheduling, and the other CIF values except the first CIF value of the N CIF values may be used as the CIF values for two cells scheduling.

Referring to FIG. 9A, one example includes N=2, and one or more CIF values 912, each of which corresponds to one or more cell for scheduling 914. For example but not limited to, Cell A is configured with CIF={0, 4}; Cell B is configured with CIF={1, 4}; Cell C is configured with CIF={2, 5}; and/or Cell D is configured with CIF={3, 5}. In one implementation, when the DCI includes a CIF=4 (917), a two cell scheduling on Cell A and Cell B may be determined and performed.

Referring to FIG. 9B, another example includes N=3, and one or more CIF values 922, each of which corresponds to one or more cell for scheduling 924. For example but not limited to, Cell A is configured with CIF={0, 4, 6}; Cell B is configured with CIF={1, 4, 7}; Cell C is configured with CIF={2, 5, 6}; and/or Cell D is configured with CIF={3, 5, 7}. In one implementation, when the DCI includes a CIF=6 (927), a two cell scheduling on Cell A and Cell C may be determined and performed.

Optionally in one implementation, the method may include scheduling physical uplink shared channel (PUSCH) when the one cell is configured with more than one CIF values. The method includes only the first CIF in the more than one CIF values for scheduling PUSCH, which may be equivalent as supporting single cell for uplink.

Optionally in anther implementation, high layer signalling may configure whether a single cell or two cells should be scheduled for a given DCI. In one implementation, one cell may be configured with a single CIF value, which is a unique CIF value different from all other cells; and this cell may be used for single cell scheduling. In another implementation, single cell scheduling and two cells scheduling may dynamically co-exist. For example as shown in FIG. 9A, the DCI may dynamically include CIF=2 (918) to indicate a single cell scheduling (i.e., Cell C); and the DCI may dynamically include CIF=4 (917) to indicate a two cells scheduling (i.e., Cell A and Cell B). For another example as shown in FIG. 9B, the DCI may dynamically include CIF=3 (928) to indicate a single cell scheduling (i.e., Cell D); and the DCI may dynamically include CIF=6 (927) to indicate a two cells scheduling (i.e., Cell A and Cell C).

Optionally in another implementation, the method may include determining and configuring a first cell and a second cell for the two cells configured for the same CIF and determining a specific position of independent indication fields in the DCI and corresponding relationship between the two cells.

Optionally in another implementation, the method may include using the DCI to schedule one cell of the two cells. This implementation may include several methods, which may be used to realize that the DCI may be used to schedule one cell. One method may include that all the independent indication fields for the second cell in DCI may be set to special values, for example but not limited to, the special value may be the same value for different independent indication fields, such as non-numerical value, all 0, all 1, or a value configured by high layer signalling. Optionally, the special value of different independent indication fields may be set independently. Another method may include that the DCI include a CIF value indicating single cell scheduling.

Optionally in another implementation, the method may include determining the DCI size. This implementation may include several methods, which may be used to determine the DCI size.

Method 1 may be used for N=2. For one or more shared indicator fields, the cell with the largest size may be used for determining the DCI size. For example, the cell with the largest size in the combination may be used to determine the size of a field. One or more least significant bit (LSB) of the field for other cells may be valid, and the indication of the one or more most significant bit (MSB) may be ignored. For one or more independent indicator fields, the method includes that the combination of one cell and the other cells is the size for determining the DCI size with the 1 DCI scheduling 2 cells.

Method 2 may be used for N>2, for example, when N=3. For one or more shared indicator fields, the cell with the largest size may be used for determining the DCI size. For example, the cell with the largest size in the valid cell in the configured combination may be used to determine the size of a field. One or more least significant bit (LSB) of the field for other cells may be valid, and the indication of the one or more most significant bit (MSB) may be ignored. For one or more independent indicator fields, one implementation may include several methods. One method includes that the combination of one cell and other cells with the largest size is the size for determining the DCI size with the 1 DCI scheduling 2 cells. Under some circumstances when the carrier combination of 2 cells is dynamic, the DCI size with 1 DCI scheduling 2 cells may be determined by adding the maximum size of other cells and the size of this cell. Another method includes that the combination of the maximum size of each bit field in other cells and this cell may be used to determine the DCI size with 1 DCI scheduling 2 cells. The latter method may result in a larger DCI size, considering that each bit field is determined by the maximum size of other cells.

Optionally in another implementation, the method may include, after determining the DCI size, performing DCI size alignment if DCI size budget is exceeded. In response to no new DCI format being introduced to schedule two cells, there is no need to modify the existing method. In response to a new DCI format being introduced, a DL assignment for the cell may have both of a DCI size for 1 DCI scheduling 2 Cells and a legacy DCI size for 1 DCI scheduling 1 Cell. The DCIs for single cell scheduling and two cells scheduling may be transmitted dynamically, for example, at the same time or different times, the new DCI format (e.g., DCI format 1_3) may be needed to differentiate from the legacy DCI format (e.g., DCI format 1_1 or format 1_2). In one implementation, DCI size budget may be increased according to the new DCI format, or the DCI size alignment may be modified without increasing DCI size budget according to the new DCI format. DCI size budget may be determined by that a UE expects to monitor PDCCH candidates for up to 4 sizes of DCI formats that include up to 3 sizes of DCI formats with cyclic redundancy check (CRC) scrambled by cell-radio network temporary identifier (C-RNTI) per serving cell. In another implementation, in response to the DCI scheduling two cells and a DCI size budget is not maintained, DCI format 0_1 and format 1_1 are aligned; in response to DCI format 1_2 and format 0_2 are configured, aligning at least one of the following: a DCI format 0_1, format 1_1, format 1_2 and format 0_2; or a DCI format 0_1, format 1_1 and the DCI scheduling two cells.

Optionally in another implementation, the method may include determining a UE-specific search space (USS) for detecting the DCI carried by PDCCH in the scheduling cell. This implementation may include several methods for determining the USS.

Method 1 includes determining the USS for performing blind decode the PDCCH based on one or both of the two cells indicated by the CIF in the DCI. The method may further include determining AL and candidates for one of the two cells. In one implementation, the one of the two cells, for example, either the first cell or the second cell of the two cells, may be configured by high layer signaling for determining AL and candidates. In another implementation, the one of the two cells may be determined based on a larger number of the candidates for the cell. For example, referring to 917 in FIG. 9A, the DCI includes the CIF=4 indicating two cells scheduling for Cell A and Cell B. When USS for detecting the DCI carried by PDCCH is determined based on any cell of the two scheduled cells, BD complexity may be increased. In one implementation, new CIF value may lead to increase new USS.

Method 2 may include determining the USS for detecting the DCI carried by PDCCH without increasing blind decoding complexity. The implementation may include various method. One method includes, in response to one of the two cells having more than one CIFs, determining the USS based on ($n_{CI}$ mod $N_{CI}$) wherein the $N_{CI}$ is a predefined or configured value, and preferably is an integer. For example but not limited to, the $N_{CI}$ may be 4. Another method, in response to one of the two cells having more than one CIFs, determining the USS based on a CIF corresponding to a single cell scheduling for at least one of the two cells. For example, referring to 917 in FIG. 9A, the DCI includes the CIF=4 indicating two cells scheduling for Cell A and Cell B, the corresponding CIF may be either CIF=0, which corresponds to Cell A, or CIF=1, which corresponds to Cell B. For another example, referring to 919 in FIG. 9A, the DCI includes the CIF=5 indicating two cells scheduling for Cell C and Cell D, the corresponding CIF may be either CIF=2, which corresponds to Cell C, or CIF=3, which corresponds to Cell D.

Optionally in another implementation, the method may include determining a number of carriers of a certain subcarrier spacing (SCS) for determining $M_{PDCCH}^{total,slot,\mu}$ or $C_{PDCCH}^{total,slot,\mu}$, in carrier aggregation (CA) scenario and a number of configured carriers is greater than a number of supported carriers reported by UE. This implementation may include several methods for determining the number of SCS.

Method 1 includes that, for the DCI scheduling two cells and performing the blind decode PDCCH in the USS determined by one or both of the two cells, the two cells may count the number of SCS corresponding to the scheduling cell as two. In one implementation, the two cells counts the number of SCS as two, which may be equivalent to perform blind decoding in the USS corresponding to one cell. In another implementation, when the number of SCS are counted during CA scaling, the two scheduled cells are counted as two cell and the corresponding number of SCS are counted accordingly.

Method 2 includes that, for the DCI scheduling two cells and perform the blind decode PDCCH in the USS based on a union set of AL and candidates according the two cells, the two cells count the number of SCS corresponding to the scheduling cell as four. Method 2 may also include that, for the DCI scheduling two cells and perform the blind decode PDCCH in the individual USS based on individual cells of the two cells, the two cells count the number of SCS corresponding to the scheduling cell as four.

Method 3 includes that, for the DCI scheduling two cells and perform the blind decode PDCCH in the USS determined by the CIF in the DCI, the two cells count the number of SCS corresponding to the valid CIF values. When the count is 2 cells, a blind decoding (BD) complexity is unchanged, which may be equivalent to that the USS of two cells are both blind decoded, and it may be equivalent to counting all the number of scheduled cells for the SCS corresponding to the scheduling cell when performing CA scaling.

The present disclosure describes methods, apparatus, and computer-readable medium for wireless communication. The present disclosure addressed the issues with scheduling multiple cells with single downlink control information (DCI). The methods, devices, and computer-readable medium described in the present disclosure may facilitate the performance of wireless transmission between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
scheduling at least one cell with downlink control information (DCI) for a user equipment (UE) by:
receiving, by the UE, the DCI via a physical downlink control channel (PDCCH) from a network base station, the DCI used to schedule at least one physical downlink shared channel (PDSCH) on the at least one cell,
wherein: the at least one cell comprises a first cell and a second cell;
the DCI used to schedule the first cell and the second cell comprises at least one of the following:
scheduling the first cell and the second cell in a semi-static mode, wherein a combination of the first cell and the second cell is semi-statically configured by high layer signalling;

scheduling the first cell and the second cell in a dynamic mode, wherein the combination of the first cell and the second cell is dynamically indicated by the DCI; and scheduling the first cell and the second cell in a semi-dynamic mode, wherein the DCI schedules the first cell and the second cell to be one of combinations semi-statically configured by the high layer signalling, and a size of the DCI is determined by, for one or more independent indicator field in the DCI for the first cell and the second cell, determining a size of the one or more independent indicator field based on adding the size of the first cell and the maximum size of other cells among the at least one cell except the first cell.

2. The method according to claim 1, wherein:

the DCI comprises a carrier indicator field (CIF); and the first cell is indicated by the DCI and the second cell is predefined according to the first cell comprising at least one of the following:

scheduling the first cell according to the CIF and scheduling the second cell according to another CIF being CIF+1;

scheduling the first cell according to the CIF and scheduling the second cell according to another CIF being zero;

scheduling the first cell according to the CIF and scheduling the second cell according to another CIF that is configured by the high layer signalling.

3. The method according to claim 1, wherein: each of the first cell and the second cell is configured to correspond to at least one CIF according to a CIF configuration; and the CIF configuration comprises at least one of the following:

configuring each of the first cell and the second cell with a CIF and configuring different cells with different CIFs;

configuring each of the first cell and the second cell with a CIF and allowing different cells with a same CIF;

configuring each of the first cell and the second cell with a first CIF and a second CIF, wherein the first CIF is used as single cell scheduling and the second CIF is used as two-cell scheduling.

4. The method according to claim 1, wherein: the DCI is used to schedule a single cell in a fallback scheduling mode by at least one of the following:

the DCI comprising a first CIF and a second CIF wherein a value of the first CIF is same as a value of the second CIF;

the DCI comprising the first CIF and the second CIF wherein one of the first CIF and the second CIF comprises a special value;

the DCI comprising at least one independent indication field wherein all of the independent indication fields have the special value.

5. The method according to claim 1, wherein: a DCI size alignment is determined by at least one of the following:

in response to the DCI scheduling two cells and a DCI size budget is not maintained, DCI format 0_1 and format 1_1 are aligned;

in response to DCI format 1_2 and format 0_2 are configured, aligning at least one of the following:

a DCI format 0_1, format 1_1, format 1_2 and format 0_2; a DCI format 0_1, format 1_1 and the DCI scheduling two cells.

6. The method according to claim 1, wherein: a UE-specific search space (USS) for detecting the DCI carried by PDCCH is determined by at least one of the following:

determining the USS for blind decoding the PDCCH based on one of the first cell and the second cell;

determining the USS for blind decoding the PDCCH based on both of the first cell and the second cell;

in response to the first cell and the second cell having a same CIF, determining the USS for blind decoding the PDCCH based on a union set of an aggregation level (AL) and candidates corresponding to the first cell and the second cell;

in response to one of the first cell and the second cell having more than one CIFs, determining the USS based on (nclmodNcl) wherein the Ncl is a predefined or configured value;

in response to one of the first cell and the second cell having more than one CIFs, determining the USS based on a CIF corresponding to a single cell scheduling for at least one of the first cell and the second cell.

7. A non-transitory computer-readable medium storing instructions, wherein, the instructions, when executed by a processor, are configured to cause the processor to implement the method according to claim 1.

8. A method for wireless communication, comprising:

scheduling at least one cell with downlink control information (DCI) for a user equipment (UE) by:

sending, by a network base station to the UE, the DCI via a physical downlink control channel (PDCCH), the DCI used to schedule at least one physical downlink shared channel (PDSCH) on the at least one cell, wherein: the at least one cell comprises a first cell and a second cell;

the DCI used to schedule the first cell and the second cell comprises at least one of the following:

scheduling the first cell and the second cell in a semi-static mode, wherein a combination of the first cell and the second cell is semi-statically configured by high layer signalling;

scheduling the first cell and the second cell in a dynamic mode, wherein the combination of the first cell and the second cell is dynamically indicated by the DCI; and scheduling the first cell and the second cell in a semi-dynamic mode, wherein the DCI schedules the first cell and the second cell to be one of combinations semi-statically configured by the high layer signalling, and a size of the DCI is determined by, for one or more independent indicator field in the DCI for the first cell and the second cell, determining a size of the one or more independent indicator field based on adding the size of the first cell and the maximum size of other cells among the at least one cell except the first cell.

9. The method according to claim 8, wherein: the DCI comprises a carrier indicator field (CIF); and the first cell is indicated by the DCI and the second cell is predefined according to the first cell comprising at least one of the following:

scheduling the first cell according to the CIF and scheduling the second cell according to another CIF being CIF+1;

scheduling the first cell according to the CIF and scheduling the second cell according to another CIF being zero;

scheduling the first cell according to the CIF and scheduling the second cell according to another CIF that is configured by the high layer signalling.

10. The method according to claim 8, wherein: each of the first cell and the second cell is configured to correspond to at least one CIF according to a CIF configuration; and the CIF configuration comprises at least one of the following:

configuring each of the first cell and the second cell with a CIF and configuring different cells with different CIFs;

configuring each of the first cell and the second cell with a CIF and allowing different cells with a same CIF;

configuring each of the first cell and the second cell with a first CIF and a second CIF, wherein the first CIF is used as single cell scheduling and the second CIF is used as two-cell scheduling.

11. The method according to claim 8, wherein: the DCI is used to schedule a single cell in a fallback scheduling mode by at least one of the following:

the DCI comprising a first CIF and a second CIF wherein a value of the first CIF is same as a value of the second CIF;

the DCI comprising the first CIF and the second CIF wherein one of the first CIF and the second CIF comprises a special value;

the DCI comprising at least one independent indication field wherein all of the independent indication fields have the special value.

12. The method according to claim 8, wherein: a DCI size alignment is determined by at least one of the following:

in response to the DCI scheduling two cells and a DCI size budget is not maintained, DCI format 0_1 and format 1_1 are aligned;

in response to DCI format 1_2 and format 0_2 are configured, aligning at least one of the following: a DCI format 0_1, format 1_1, format 1_2 and format 0_2; a DCI format 0_1, format 1_1 and the DCI scheduling two cells.

13. An apparatus comprising: a memory storing instructions; and a processor in communication with the memory, wherein, when the processor executes the instructions, the processor is configured to cause the apparatus to perform the method according to claim 8.

14. A non-transitory computer-readable medium storing instructions, wherein, the instructions, when executed by a processor, are configured to cause the processor to implement the method according to claim 8.

15. An apparatus comprising: a memory storing instructions; and a processor in communication with the memory, wherein, when the processor executes the instructions, the processor is configured to cause the apparatus to perform:

scheduling at least one cell with downlink control information (DCI) for the apparatus by:

receiving, by the apparatus, the DCI via a physical downlink control channel (PDCCH) from a network base station, the DCI used to schedule at least one physical downlink shared channel (PDSCH) on the at least one cell, wherein: the at least one cell comprises a first cell and a second cell;

the DCI used to schedule the first cell and the second cell comprises at least one of the following:

scheduling the first cell and the second cell in a semi-static mode, wherein a combination of the first cell and the second cell is semi-statically configured by high layer signalling;

scheduling the first cell and the second cell in a dynamic mode, wherein the combination of the first cell and the second cell is dynamically indicated by the DCI; and scheduling the first cell and the second cell in a semi-dynamic mode, wherein the DCI schedules the first cell and the second cell to be one of combinations semi-statically configured by the high layer signalling, and a size of the DCI is determined by, for one or more independent indicator field in the DCI for the first cell and the second cell, determining a size of the one or more independent indicator field based on adding the size of the first cell and the maximum size of other cells among the at least one cell except the first cell.

* * * * *